(12) United States Patent
Sonar

(10) Patent No.: US 11,007,905 B2
(45) Date of Patent: May 18, 2021

(54) BLOCKING AND CONTACT SYSTEM FOR THE ELECTRICAL CONNECTION OF AN ON-BOARD POWER SUPPLY OF A MOTOR VEHICLE TO A REMOVABLE VEHICLE SEAT OR A SEAT SYSTEM

(71) Applicant: Magna Seating (Germany) GmbH, Sailauf (DE)

(72) Inventor: Sachin Sonar, Aschaffenburg (DE)

(73) Assignee: MAGNA SEATING (GERMANY) GMBH, Sailauf (DE)

( * ) Notice: Subject to any disclaimer, the term of this patent is extended or adjusted under 35 U.S.C. 154(b) by 125 days.

(21) Appl. No.: 16/444,654

(22) Filed: Jun. 18, 2019

(65) Prior Publication Data

US 2020/0009995 A1 Jan. 9, 2020

(30) Foreign Application Priority Data

Jul. 4, 2018 (DE) .......................... 102018211055.7

(51) Int. Cl.
*B60N 2/08* (2006.01)
*B60N 2/02* (2006.01)
*B60R 16/03* (2006.01)

(52) U.S. Cl.
CPC ......... *B60N 2/0843* (2013.01); *B60N 2/0228* (2013.01); *B60N 2/0818* (2013.01); *B60R 16/03* (2013.01)

(58) Field of Classification Search
CPC .......... B60N 2002/0264; B60N 2/0818; B60N 2/0228; B60N 2/0887; B60N 2/0843; B60R 16/03

USPC ............................ 296/65.15; 248/429, 503.1
See application file for complete search history.

(56) References Cited

U.S. PATENT DOCUMENTS

| | | | | |
|---|---|---|---|---|
| 6,488,249 B1 * | 12/2002 | Girardi | ............. | B60N 2/01541 248/424 |
| 6,663,157 B1 * | 12/2003 | Hofmann | ........... | B60N 2/01516 248/503.1 |
| 9,114,735 B2 * | 8/2015 | Utzinger | ............... | B60N 2/0881 |
| 10,195,963 B2 * | 2/2019 | Flick | ..................... | B60N 2/0705 |
| 10,569,669 B2 * | 2/2020 | Dry | ....................... | B60N 2/0224 |
| 2005/0173608 A1 | 8/2005 | Lory | | |
| 2019/0337414 A1 * | 11/2019 | Condamin | ........... | B60N 2/0818 |
| 2019/0337420 A1 * | 11/2019 | Condamin | ............... | B60N 2/20 |
| 2019/0337422 A1 * | 11/2019 | Condamin | ........... | B60N 2/0722 |

(Continued)

FOREIGN PATENT DOCUMENTS

| | | |
|---|---|---|
| DE | 29712180 U1 | 9/1997 |
| DE | 10046204 A1 | 6/2002 |

(Continued)

OTHER PUBLICATIONS

German Search Report for German Patent Application No. 102018211055.7, dated Feb. 22, 2019, 6 pages.

*Primary Examiner* — Bradley Duckworth
(74) *Attorney, Agent, or Firm* — Jordan IP Law, LLC; Todd A. Vaughn

(57) ABSTRACT

A blocking and contact system for an electrical connection of an on-board power supply of a motor vehicle to a vehicle seat or a seat system that is blockable, removable, and longitudinally displaceable. Such a system is of structurally simple construction, and facilitates a rapid and automatic electrical connection in every position without additional control by a user.

16 Claims, 9 Drawing Sheets

(56) References Cited

U.S. PATENT DOCUMENTS

2019/0337471 A1* 11/2019 Brehm .................... B60N 2/08
2020/0079243 A1* 3/2020 Bork .................... B60N 2/0228

FOREIGN PATENT DOCUMENTS

DE       102016113409 A1     4/2017
EP           1176047 A1 *   1/2002   ......... B60N 2/01541
EP           2298609 B1     12/2012

* cited by examiner

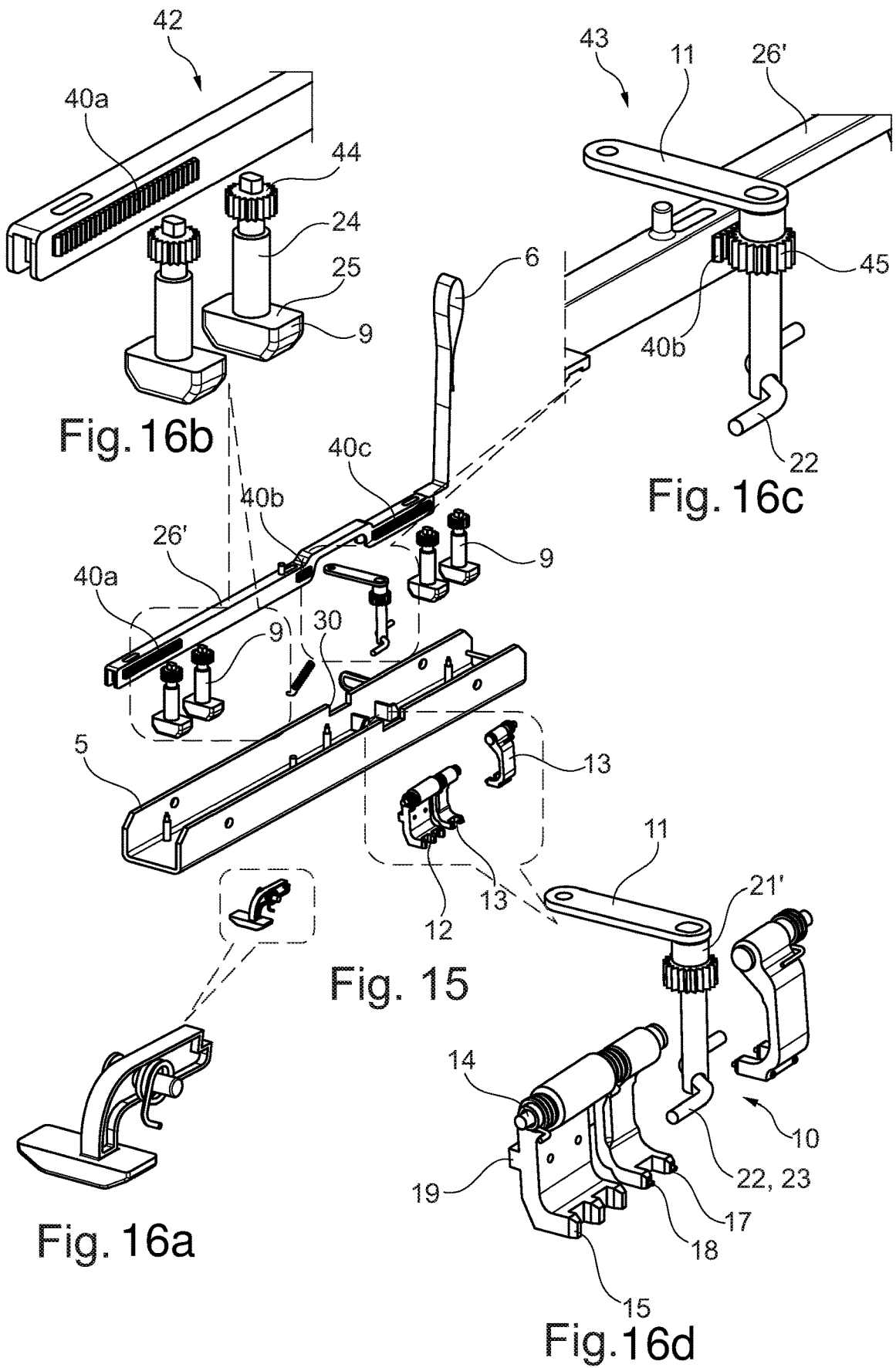

BLOCKING AND CONTACT SYSTEM FOR THE ELECTRICAL CONNECTION OF AN ON-BOARD POWER SUPPLY OF A MOTOR VEHICLE TO A REMOVABLE VEHICLE SEAT OR A SEAT SYSTEM

CROSS-REFERENCE TO RELATED APPLICATIONS

The present application claims priority 35 U.S.C. § 119 to German Patent Publication No. DE 102018211055.7 (filed on Jul. 4, 2018), which is hereby incorporated by reference in its complete entirety.

TECHNICAL FIELD

Embodiments relate to a blocking and contact system for an electrical connection of an on-board power supply of a motor vehicle to a removable vehicle seat or a seat system.

BACKGROUND

Vehicle seats for driver and passengers are arranged on the motor vehicle floor for setting an optimal seating position in a longitudinally displaceable manner via a rail system which comprises two seat rail pairs running in parallel. The position of the seat is blockable via a locking mechanism arranged in the region of the seat rail pairs. The blocking may be released by an occupant via actuating levers, and the seat may be displaced along the rail on the vehicle side.

In order to increase the loading surface it is further known to connect these vehicle seats, in particular, of a second and a third seat row, releasably to the vehicle floor, such vehicle seats being attached in a longitudinally displaceable manner. Such a fastening system of vehicle seats is disclosed, for example, in European Patent Publication No. EP 0 949 111 B1. This modular fastening system comprises a cam control for a displacement of the motor vehicle seat in the longitudinal direction and a blocking of the seat in the set position. A control cam which is able to be actuated via an actuating lever effects a pivoting of locking mechanism. As a result, the vehicle seat may be blocked in the rails, the vehicle seat may be released for the purpose of longitudinal displacement, and a position of the components of the fastening system, in which a removal of the motor vehicle seat is possible, may be set.

Additionally, motor vehicle seats are frequently provided with functions which require an electrical connection to the on-board power supply of the motor vehicle. Such a function is, for example, seat heating or the capacity to set the seat height and seat depth electrically. In the case of removable motor vehicle seats, this electrical connection should also be releasable, and in the case of reinserting the motor vehicle seat, it is necessary that a secure contact of the electrical connection be easily reproduced. This, however, is difficult and structurally complex should the motor vehicle seat is attached in a longitudinally displaceable manner on the vehicle floor and is designed such that the seat may be removed and reinserted at any position along the rail system. In this case, it has to be ensured that in every position of the motor vehicle seat along the floor rail a contact is possible between the power supply on the vehicle side and the motor vehicle seat.

SUMMARY

Provided in accordance with embodiments is a blocking-contact system for an electrical connection of an on-board power supply of a motor vehicle to a vehicle seat which is blockable, removable, and longitudinally displaceable. Such a system is of structurally simple construction, and in that both during insertion and after a longitudinal displacement of a motor vehicle seat, facilitates a rapid and automatic electrical connection in every position, i.e., without additional control by a user.

Provided in accordance with embodiments is a blocking and contact system for the electrical connection of an on-board power supply of a motor vehicle to a vehicle seat which is blockable, removable, and longitudinally displaceable.

In accordance with embodiments, the blocking and contact system for an electrical connection of an on-board power supply of a motor vehicle to a removable seat, an automatic contact of the motor vehicle seat is facilitated when inserting the motor vehicle seat at any position along the seat rail. A removal of the motor vehicle seat is accordingly also possible at any position along the rail system. Moreover, the user, in turn, notices no difference from a conventional removable seat having no electrical connection.

In accordance with embodiments, the contact in this case is effected via pivotably attached contact elements when inserting the motor vehicle seat.

In accordance with embodiments, during the contact of the motor vehicle seat with the on-board power supply, at least one connection may be produced with the power supply and also at least one data connection.

In accordance with embodiments, the longitudinal direction corresponds to the x-direction, the transverse direction corresponds to the y-direction, the vertical direction corresponds to the z-direction in the description and the associated drawings.

In accordance with embodiments, the motor vehicle seat is provided with electrical functions which may comprise a plurality of electrical consumers, such as for example seat heating, seat height adjustment, seat depth adjustment, etc. For controlling and/or regulating the electrical functions, a control unit may be arranged in the motor vehicle seat.

DRAWINGS

Embodiments will be illustrated by way of example in the drawings and explained in the description below.

FIG. 10b illustrates a top view of a lever of the release mechanism in a first position of FIG. 10a.

FIG. 15 illustrates an exploded view of the seat rail with the contact system of FIG. 14.

FIGS. 16a to 16d illustrates enlarged partial details of the individual components of the seat rail with the contact system of FIG. 15.

DESCRIPTION

Figure 1:
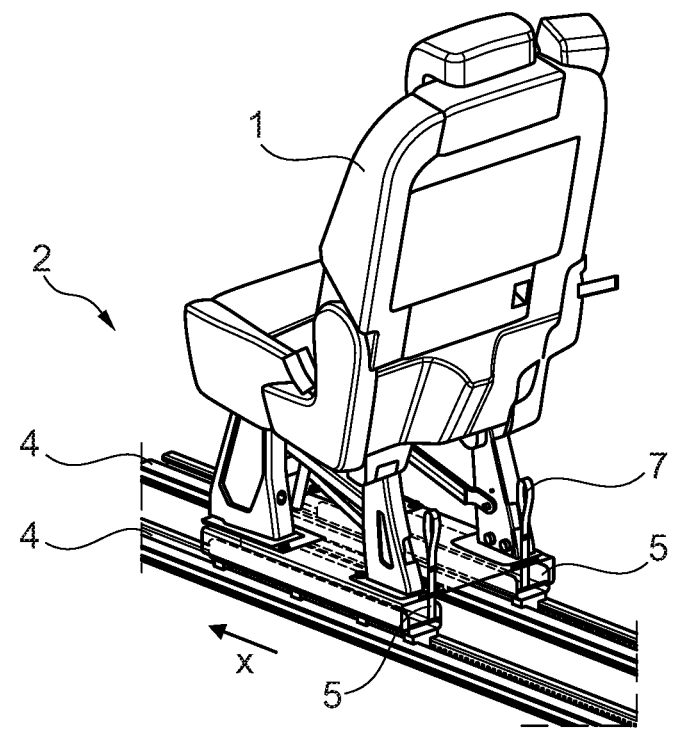
FIG. 1 illustrates a perspective view of a motor vehicle seat obliquely from the rear, said motor vehicle seat being attached in a longitudinally displaceable manner to a rail system.
Figure 2:
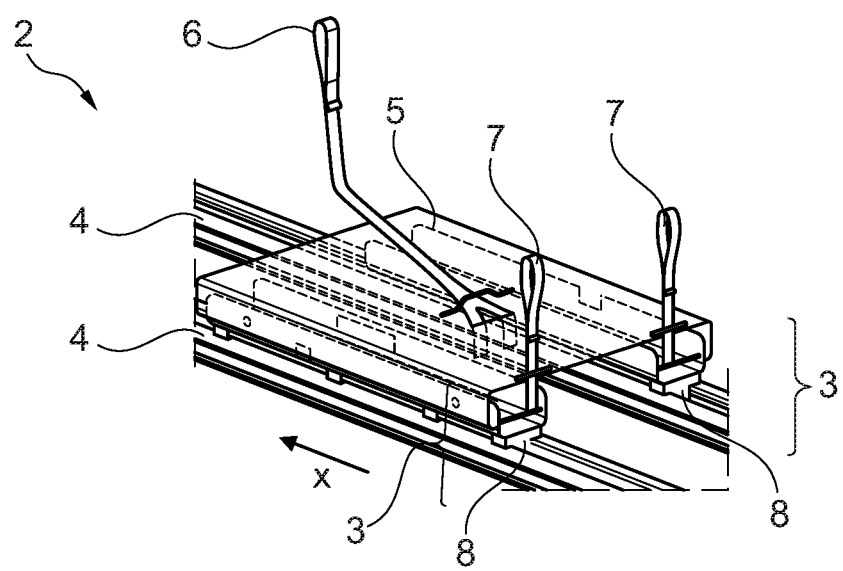
FIG. 2 illustrates a view of the rail system with a cross-member for attaching the motor vehicle seat of FIG. 1.

As illustrated at least in FIGS. 1 and 2, provided in accordance with embodiments is a motor vehicle seat 1 having electrical functions. The motor vehicle seat 1 is mounted in a longitudinally displaceable manner via a rail system 2 which has two seat rail pairs 3 running in parallel, i.e., in a x-direction on the vehicle body. A seat rail pair 3 in each case has a floor rail 4 which is fixed to the vehicle, i.e., attached to a floor element, and a seat rail 5 mounted in a longitudinally displaceable manner on the floor rail 4 and attached to the motor vehicle seat 1.

Figure 12:
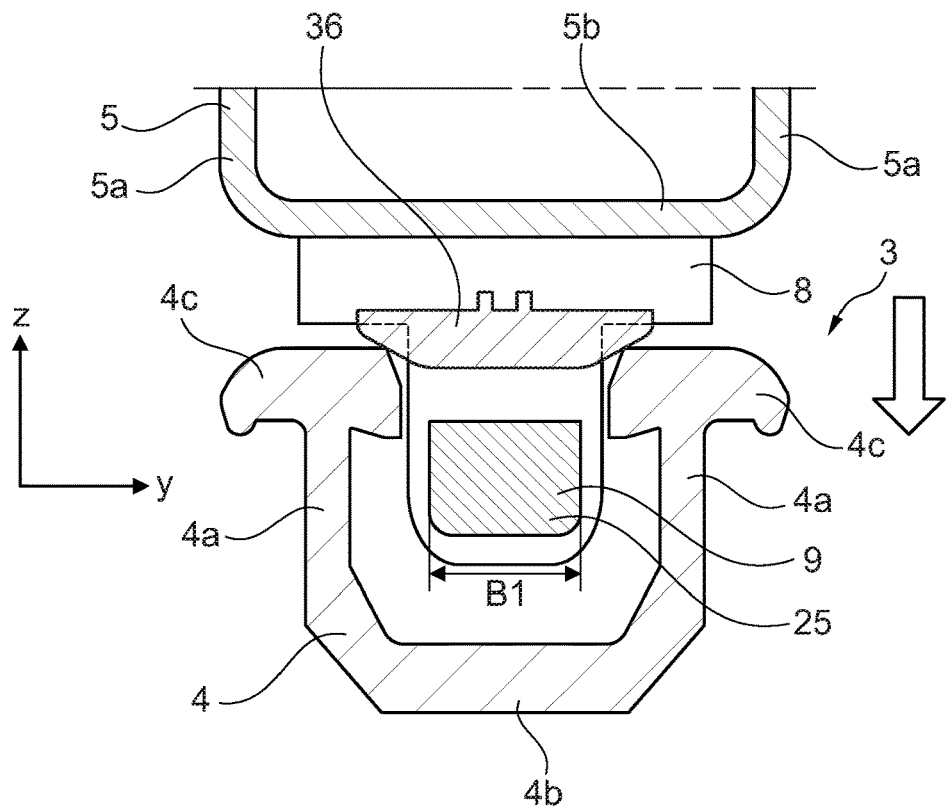
FIG. 12 illustrates a cross-sectional view through a seat rail pair when inserting the motor vehicle seat in a first mounting position.
Figure 13:
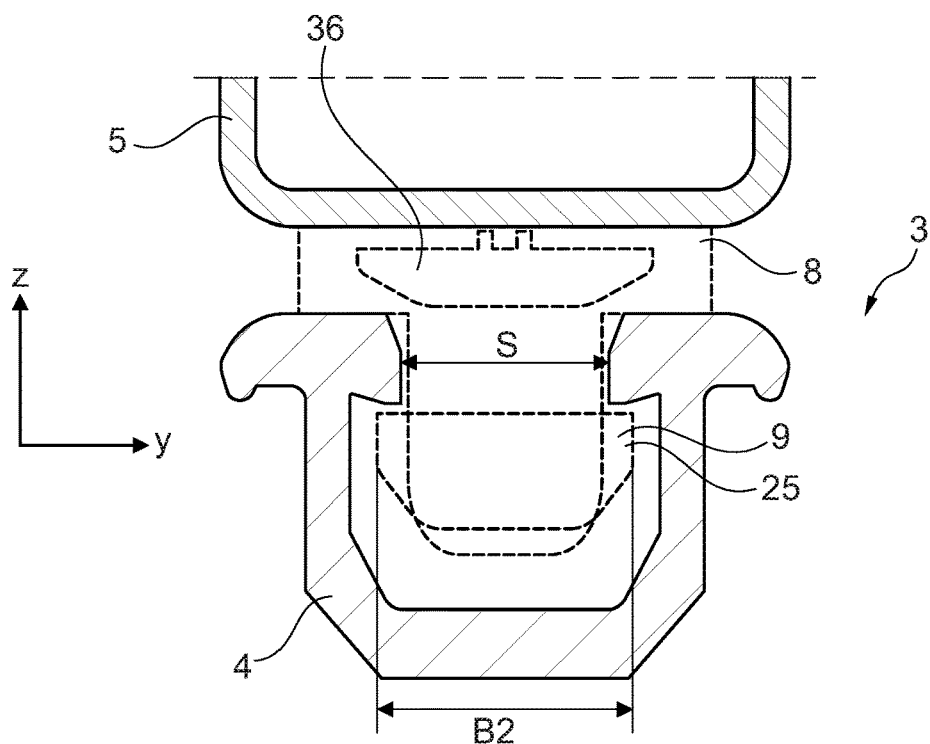
FIG. 13 illustrates the cross-sectional view of FIG. 12 in a second mounting position.

As illustrated in FIGS. 12 and 13, it may be identified that the seat rails 5 are designed as U-shaped profiles having arms 5a and a web 5b connecting the arms 5a. The floor rails 4 are also designed as upwardly open U-shaped profiles and have arms 4a extending laterally in the z-direction and a base 4b connecting the arms 4a. Guide surfaces 4c running in the longitudinal direction and extending in the transverse direction are designed at the end regions of the arms 4a. An insertion slot S remains between the guide surfaces 4c.

The position of the motor vehicle seat 1 is lockable via blocking units acting between the floor rails 4 and the seat rails 5. The blocking may be released via a first actuating element 6 by an occupant and the motor vehicle seat 1 (seat) may be displaced along the floor rails 4 which are fixed to the structure (longitudinally adjusted position). In the longitudinally adjusted position of the motor vehicle seat 1, the motor vehicle seat is displaceably held via sliding elements 8 along the floor rails 4, and a removal of the seat in the vertical direction (z-direction) is blocked via locking elements 9.

In the blocked position (position of use), the motor vehicle seat 1 is held both blocked via the locking units and electrically in contact via contact units, i.e. an electrical connection is present between the motor vehicle seat and/or electrical/electronic consumers integrated in the motor vehicle seat and the on-board power supply. For the purpose of activating the functions integrated in the seat, advantageously a connection is also produced with at least one data line in the position of use. The power supply line in this case may also be used as a data line.

For the removal of the motor vehicle seat 1 from the floor rails 4, two second actuating elements 7 are provided, in each case said second actuating elements being arranged in the region of the seat rail on the rear face of the motor vehicle seat 1, and when actuated by an occupant releasing both the blocking via the locking units in the longitudinal adjustment direction (x-direction) and also the locking via the locking elements 9 in the removal direction (z-direction), so that the seat may be removed. At the same time, by the actuation of the second actuating elements 7 the electrical connection between the motor vehicle seat 1 and the on-board power supply is released (removal position). Details thereof are described with reference to the corresponding further drawings.

Figure 3:
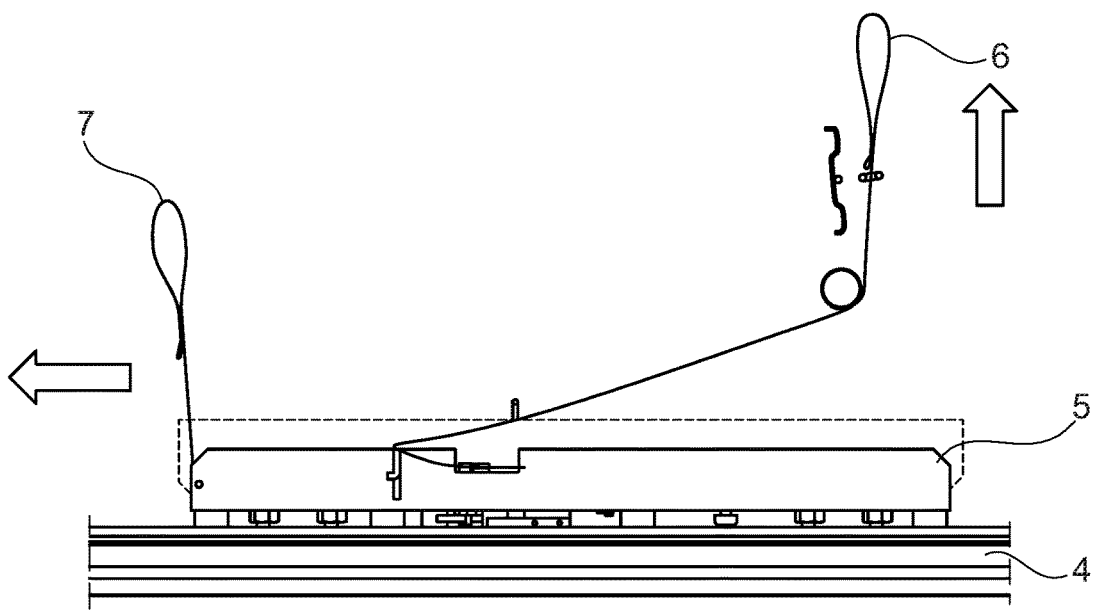
FIG. 3 illustrates a side view of the contact system in accordance with embodiments with the rail system of FIG. 2, which comprises a floor rail and a seat rail, with actuating elements for removing the motor vehicle seat and actuating elements for adjusting the motor vehicle seat along the floor rail.

In FIG. 3, in a side view of a seat rail pair 3, the actuating direction of the actuating elements 6, 7 is indicated by arrows. With an actuation of the actuating element 6 in the direction of the arrow, the longitudinally adjusted position of the seat is set at the same time. With an actuation of the actuating element 7 in the direction of the arrow, the removal position is effected. The actuating elements 6, 7 are generally known to the person skilled in the art and may comprise levers, straps, Bowden cables etc.

Figure 4A:
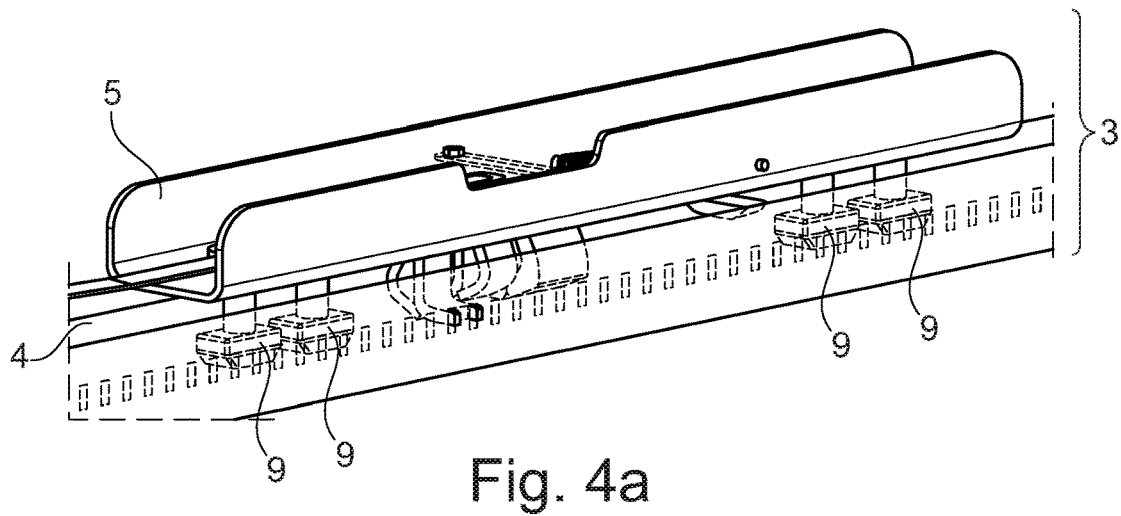
FIG. 4a illustrates a perspective view of a seat rail pair with a contact system in a state in which the motor vehicle seat is removable from the floor rail and is held in the floor rail.
Figure 4B:
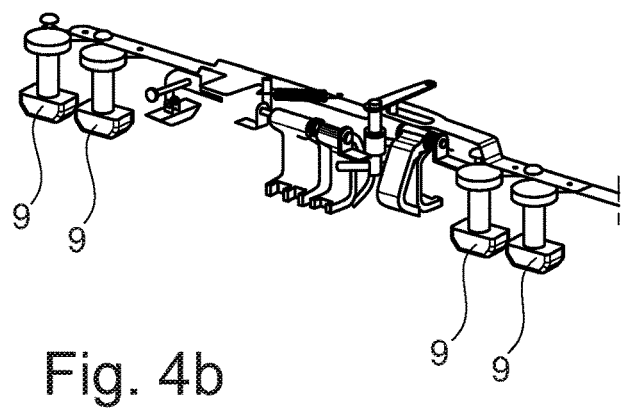
FIG. 4b illustrates a perspective view of the state of FIG. 4a in a view of the blocking and contact system with blocking elements, locking and contact elements without the seat rail pair.

FIG. 4a shows in a perspective view a seat rail pair 3 of one side of the motor vehicle seat 1. In the situation shown, the locking elements are in an unlocked position, i.e. the motor vehicle seat 1 may be removed in the z-direction from the floor rail 4. For the purpose of removing the seat 1, the blocking unit and the contact unit are also in the unlocked and/or released position. The locking elements 9, the blocking unit 10 and the contact unit act between the floor rail 4 and the seat rail 5. The view of FIG. 4b shows essential components of the blocking and contact system without the seat and floor rail.

Figure 5A:
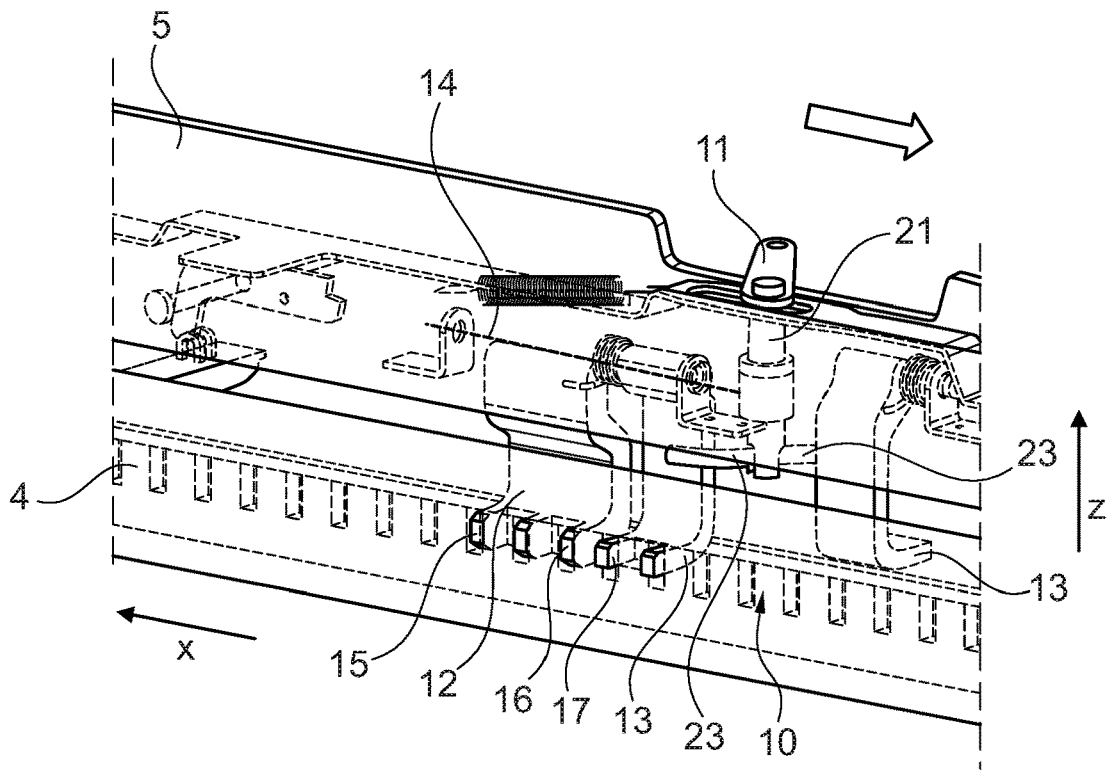
FIG. 5a illustrates an enlarged detail of essential elements of the blocking and contact system in accordance with embodiments in a state in which the motor vehicle seat is blocked in the floor rail and is held in contact.

FIG. 5a shows, in a perspective detail of a seat rail pair 3, the position of use in which the motor vehicle seat 1 is blocked and held in contact. The detail shows the essential components of the blocking and contact unit 10 and an actuating lever 11 which is coupled to be operatively connected to the first actuating element 6 and, when actuated in the direction of the arrow in FIG. 5a, effects a setting of the longitudinal adjustment position.

Figure 5B:
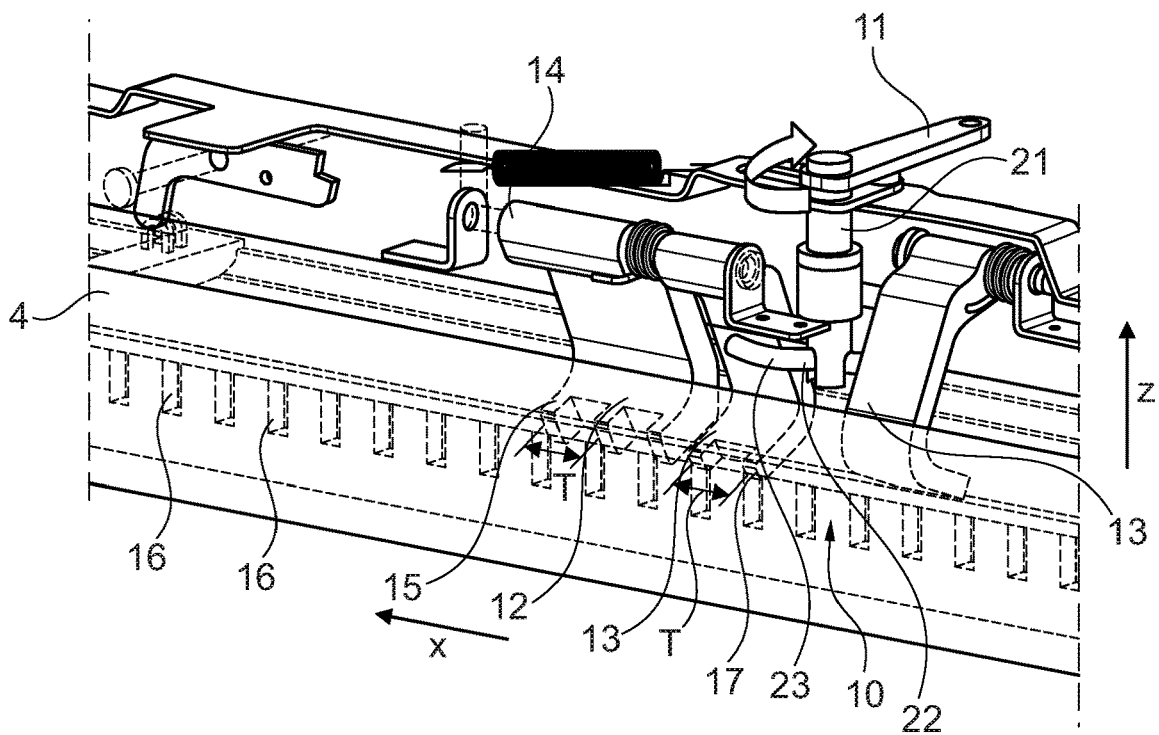
FIG. 5b illustrates an enlarged detail of essential elements of the contact system in accordance with embodiments in a state in which the motor vehicle seat is released and the blocking and contact in the floor rail is released.

The blocking and contact unit 10 in this case comprises blocking and contact elements 12, 13 which are opposingly arranged substantially in pairs in the longitudinal direction so as to be mirrored about the longitudinal axis. In this case, each pair comprises a blocking element 12 and a contact element 13 which are arranged adjacent to one another in the longitudinal direction. The blocking and contact elements 12, 13 are held on the seat rail 5 of substantially U-shaped design to be pivotable and spring-preloaded about an axis 14 which is oriented in the longitudinal direction, in the direction of the floor rail. In each case, an entrainer yoke 19 which is of cylindrical design is attached to the rear face of the blocking elements 12 and, with a pivoting movement of the blocking element 12 in the direction of the grooves 16 along a short pivoting path, said entrainer yoke entrains the contact element 13. The entrainer yoke 19 is not shown in FIGS. 5a, 5b. In the position of use which is shown in FIG. 5a, the blocking elements 12 positively engage with a toothed profile 15 in corresponding grooves 16 of the floor rail. By this positive connection, a displacement in the x-direction is blocked between the seat rail 5 and the floor rail 4. From the drawings, it may be identified that the grooves 16 are arranged so as to be distributed at regular intervals along the side arms S of the floor rail 4. As a result, the seat rail 5 may be blocked at any position along the floor rail 4. The contact elements 13 also have on their lower end region a toothed profile 17 with two teeth which also engage in the grooves 16 and/or pass through the grooves and generate a contact via contact pins 18 on a contact rail running in the longitudinal direction. The contact pins 18 are arranged on the front face in the teeth extending in the y-direction. The teeth of the toothed profiles 15 and 17 have the same pitch T.

The contact pins 18 are designed from copper. Naturally, a different electrically conductive material may also be used. The contact pins 18 are connected via corresponding contact elements for the electrical connection to the electrical consumers of the motor vehicle seat. This is not shown here and is also not explained in more detail.

The contact rail is not shown illustratively and is arranged fixed to the vehicle structure on a floor element of the motor vehicle or is arranged running in parallel on the floor rail 4. Since contact elements 13 are arranged on both sides in the longitudinal direction of the seat rail 5, contact rails are also arranged on both sides of the floor rail 4. The contact rails have electrically conductive strips, for example copper strips, and are connected to an on-board power supply line of the on-board power supply of the motor vehicle. Electrical current and/or electrical signals may be transmitted via the on-board power supply line. The on-board power supply line and the connection with the copper strips are also not shown illustratively.

The blocking and contact unit 10 also comprises a pivot pin 21 which is pivotably mounted about an axis 20 running in the z-direction and which is attached to the actuating lever 11 and, when actuating the actuating lever 11, pivots about its vertical axis. The rotational movement is shown by the arrow in FIG. 5b. A driver element 22 which is guided centrally through the pivot pin 21 is arranged at the lower end region of the pivot pin 21, said driver element on either side having radially outwardly guided entrainer yokes 23. With the rotation of the pivot pin 21 which is effected by the actuation of the actuating element 6 by a user, the entrainer yokes 23 also rotate therewith and effect a pivoting of the contact elements 13 into a position for interrupting the electrical connection. By the pivoting of the contact elements 13, the blocking elements 12 are also pivoted via the entrainer yokes into an unlocked position. In the unlocked position, the toothed profiles 15 of the blocking elements 12 no longer positively engage in the grooves 16 of the floor rail 4, so that the seat 1 is in the longitudinal adjustment position and the user may displace the seat 1 along the floor rails 4.

After the user has adjusted the seat 1 and released the actuation of the actuating element 6, the actuating element 11 pivots again into the position of use shown in FIG. 5a by the rotation of the pivot pin 21. With the rotation of the pivot pin 21 counter-clockwise, the entrainer yokes are released from corresponding stop surfaces on the contact elements 12, and the contact elements 13 and blocking elements 12 pivot due to the spring pre-loading into the blocked position of the blocking elements 12 and the position of the contact elements 13 in which an electrical connection is generated between the floor rail/on-board power supply and motor vehicle seat 1 (FIG. 5a).

Figure 6:
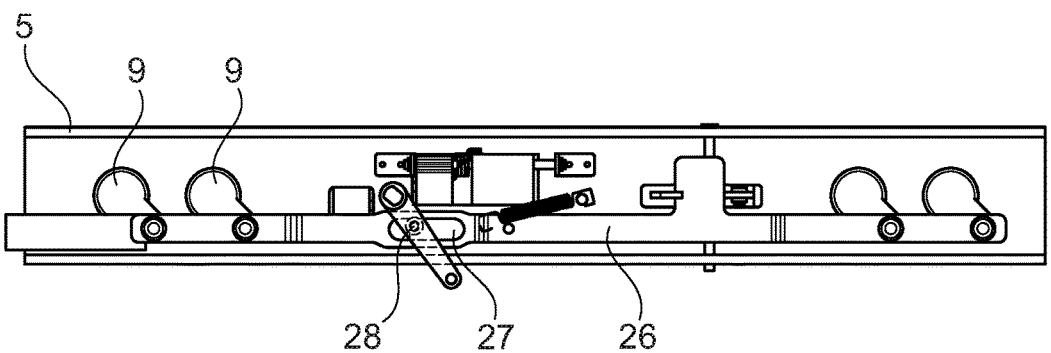
FIG. 6 illustrates a plan view of a seat rail with a contact system in a state in which the motor vehicle seat is blocked in the floor rail and held in contact.
Figure 7:
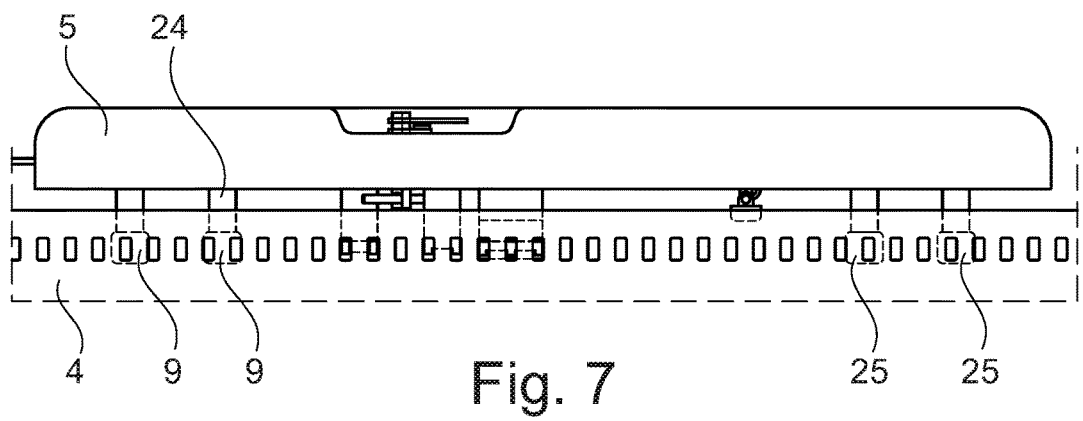
FIG. 7 illustrates a side view of the seat rail with a contact system of FIG. 6.
Figure 8:
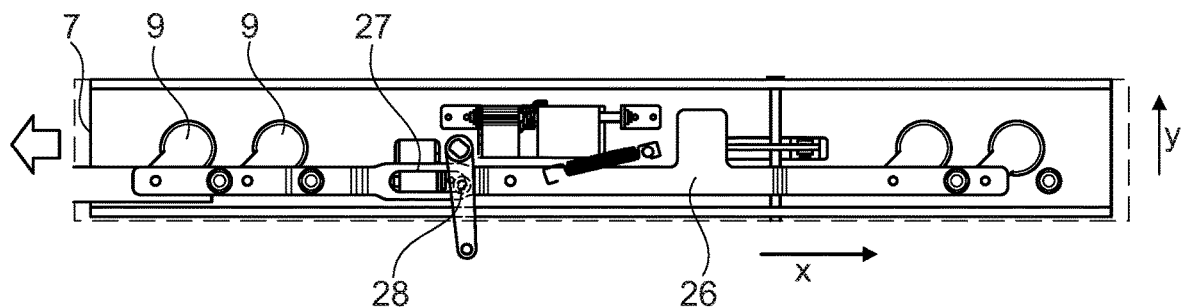
FIG. 8 illustrates a plan view of a seat rail with a contact system in a state in which the blocking and contact of the motor vehicle seat in the floor rail is released and the motor vehicle seat is removeable from the floor rail.

FIGS. 6 and 7 show in a plan view of the seat rail and in a side view of a rail pair 3 the motor vehicle seat 1 in the position of use, i.e. blocked in the x-direction, in the z-direction and in contact. The arrangement of the blocking elements 12 and contact elements 13 is already described with reference to FIG. 5a. From the view of FIGS. 6 and 7, the locking in the z-direction which is achieved by the locking elements 9 may be additionally identified. The locking elements 9 comprise a pivot pin 24 and a slide block 25. The slide block 25 is dimensioned such that when inserting the motor vehicle seat the locking elements 9 may be guided in a first position through the slot S (the width B1 of the slide blocks is less than the clear width of the slot S) and in a second position effect a locking of the seat 1 in the z-direction. In this locked position, the slide blocks 25 are oriented to run in the y-direction and have a width B2 which is greater than the clear width of the slot S. The locking elements 9 are pivotably attached to an actuating rail 26 at their upper end region on the pivot pin 24. The actuating rail 26 is mounted in the seat rail 5 in a longitudinally displaceable manner and may be actuated via the second actuating element. The actuation of the actuating rail 26 by an actuation of the actuating element 7 by a user for setting the seat in the removal position is shown in FIG. 8 by the arrow. When displacing the actuating rail 26 in the direction of the arrow, the locking elements 9 rotate clockwise into the first position. As may be identified from the view of the Figs., in each case two locking elements 9 are attached to the actuating rail at the front-end region of the seat rail 5 and at the rear end region of the seat rail 5.

Figure 9:
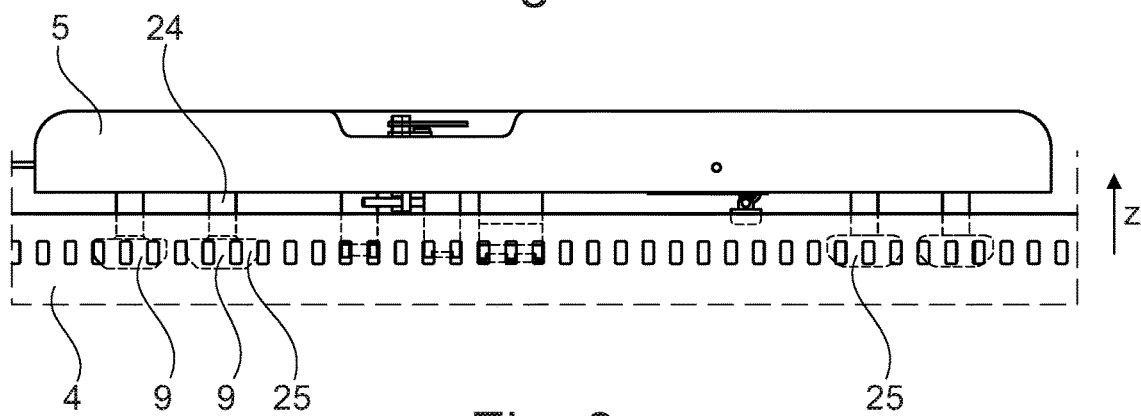
FIG. 9 illustrates a side view of the seat rail with a contact system of FIG. 8.

The actuating rail 26 also has, in the region of the actuating lever 11, a groove 27 in which the actuating lever 11 is mounted to be guided via a pin 28. It may be identified from the drawings in FIG. 6 that the actuating lever is in a first position which corresponds to the position of use of the seat 1. The blocking elements are in the locked position and the contact elements 13 are in contact. With the displacement movement in the direction of the arrow in FIG. 8 for setting the seat into the removal position, in addition to the adjustment of the locking elements 9 as described above, an actuation of the actuating lever 11 into the position shown in FIG. 8 is affected. This takes place via the displacement of the actuating rail and the displacement of the groove so that the pin 28 bears against a surface which defines the groove and which serves as a stop, and with a further displacement of the actuating rail the actuating lever 11 is pivoted about the axis 20. This pivoting affects a release of the blocking elements 12 from the floor rail 4 and a release of the electrical contact between the contact elements 13 and/or contact pins 18. This is explained in detail with reference to FIGS. 5a and 5b. In the position shown in FIGS. 8 and 9, the seat 1 is in the removal position, is unlocked in the z- and x-direction and the contact is released, and the seat may be removed by a user from the floor rails.

Figure 10A:
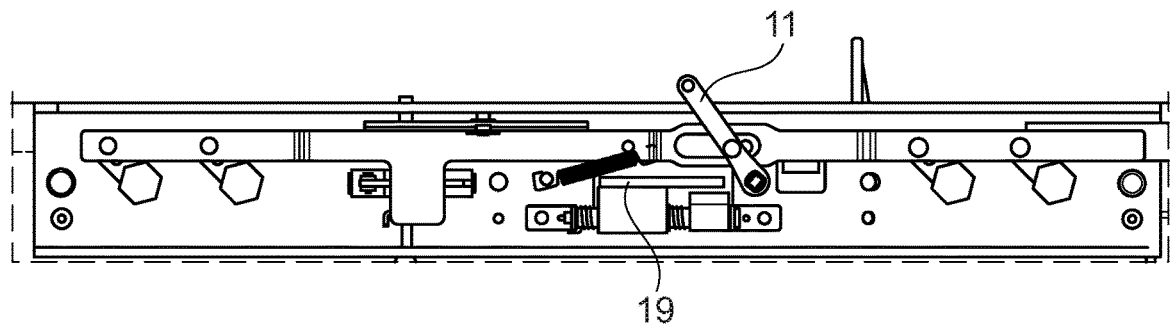
FIG. 10a illustrates a plan view of the seat rail with the contact system with a view of the release mechanism for the blocking and contact of the motor vehicle seat.
Figure 10B:
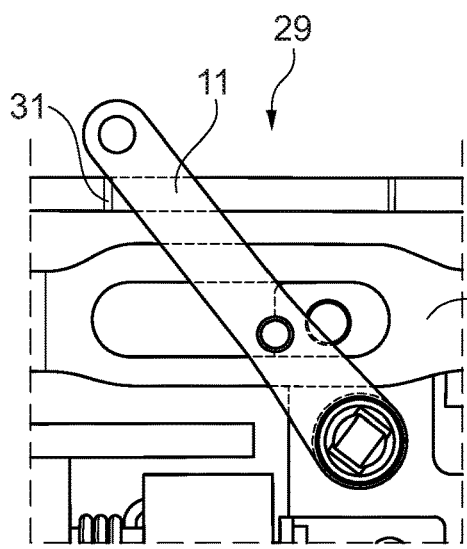
Figure 10C:
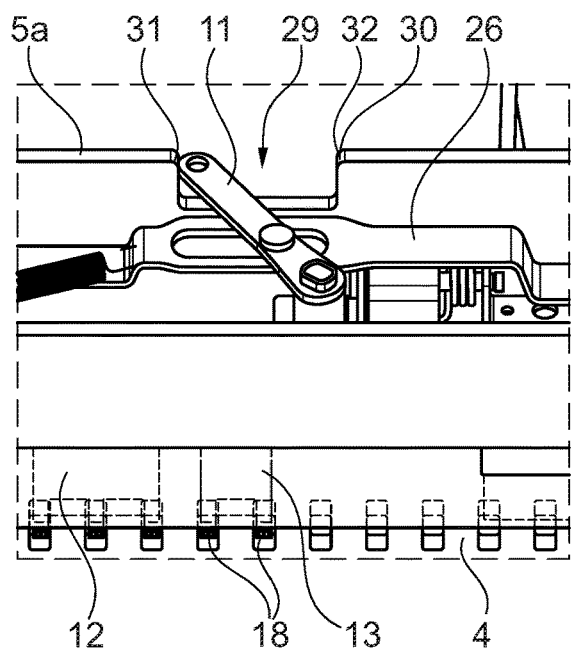
FIG. 10c illustrates a perspective view of the lever of the release mechanism of FIG. 10b.
Figure 10D:
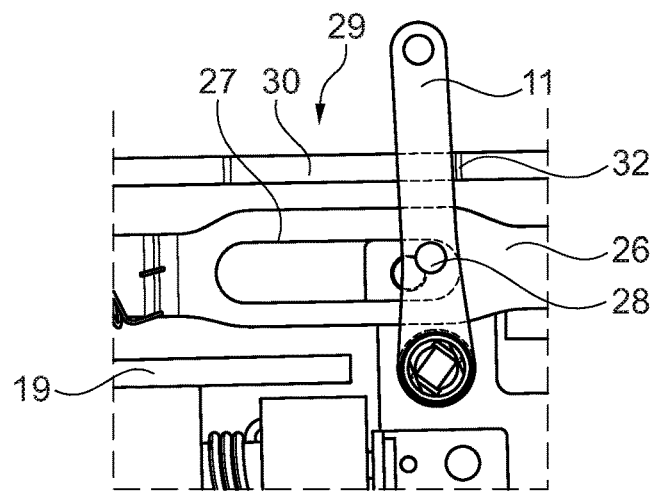
FIG. 10d illustrates a top view of the lever of the release mechanism of FIG. 10b in a second position of the lever.

FIGS. 10a-10d show in a plurality of views and details the stop for limiting the pivoting movement of the actuating lever 11. This stop 29 is designed as a rectangular recess 30 in the arm 5a. In this case, FIGS. 10a to 10c show the position of the actuating lever 11 in which the seat 1 is blocked and in contact (position of use). In this position, the actuating lever 11 bears against the left-hand side of the side wall 31 defining the recess 30. The pivoting movement of the actuating lever 11 into the unlocked position of the blocking elements 12 and contact elements 13 is defined by the right-hand side wall 32 of the recess 30. This is shown in FIG. 10d.

In FIGS. 11a to 11e, in a plurality of views and details, the limit of the displacement movement of the actuating rail 26 when actuating the actuating element 7 is shown. The actuating direction when actuating the actuating element 7 for setting the removal position is indicated by the arrow in FIG. 11a. To this end, the actuating rail 26 has a link plate 33 extending perpendicularly and upwardly on the edge side in the z-direction. Depending on the desired displacement path, a groove 34 with corresponding dimensions is incorporated into the link plate 33. A stop in the form of a pin 35 is arranged on the side rail in the region of the inner face of the arm 5a. The pin 35 passes through the groove 34.

Figure 11A:
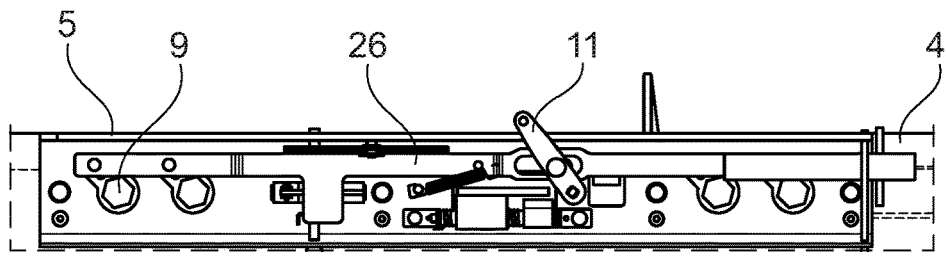
FIG. 11a illustrates a plan view of the seat rail with the contact system, with a view of the release mechanism for the blocking and contact of the motor vehicle seat.
Figure 11B:
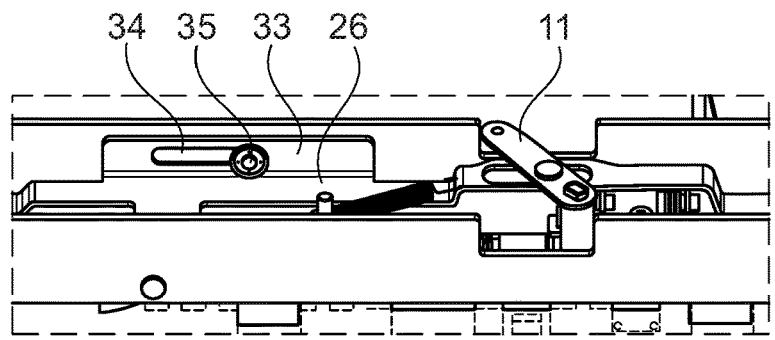
FIG. 11b illustrates a perspective view of seat rail with the contact system of FIG. 11a, with the stop in a first position.
Figure 11C:
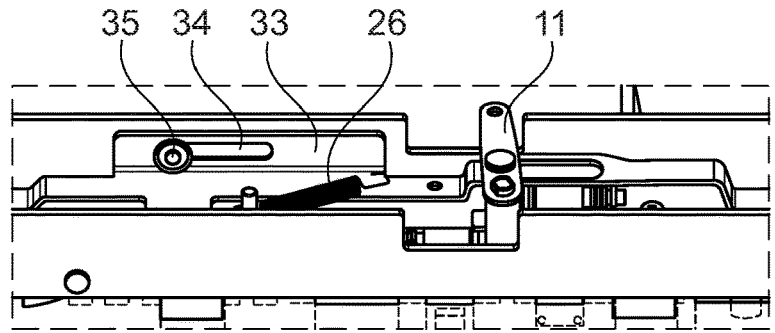
FIG. 11c illustrates a perspective view of seat rail with the contact system of FIG. 11a, with the stop in a second position.
Figure 11D:
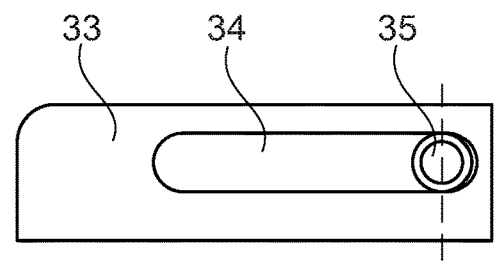
FIG. 11d illustrates a side view of the stop of FIG. 11a in a blocking position.
Figure 11E:
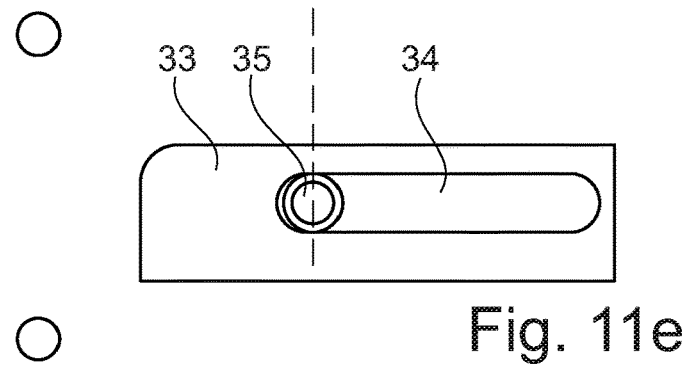
FIG. 11e illustrates a side view of the stop of FIG. 11a in a position of the release of the motor vehicle seat for removal.

FIGS. 11b and 11d, in the detail of the link plate, show the position of use of the seat. Here the pin 35 bears against the right-hand side of the inner surface defining the groove 34 as a stop. In FIGS. 11c and 11d, in the detail of the link plate, the removal position of the seat 1 is shown. Here the pin 35 bears against the left-hand side of the inner surface defining the groove 34.

FIG. 12 shows in cross section in a schematic view the situation when inserting the seat 1 into the floor rail 4. The insertion into the floor rail 4 is indicated by the arrow. When inserted into the floor rail, both the sliding elements 8 and the locking elements 9 penetrate between the insertion slot into the U-shaped profile. The locking elements 9 in this case are in the unlocked position. As may be identified further from the drawing, in this situation a guide element 36 bears against the guide surfaces 4c of the floor rail 4. The guide element 36 is rectangular in cross section with edges bevelled in the y-direction on the side facing downwardly. Via a lever which is arranged to run in the x-direction, the guide element 36 is pivotably attached to the seat rail about an axis running in the y-direction.

The situation after inserting the seat into the floor rail, in which the seat is in the position of use, is shown in FIG. 13. Here it may be seen that the locking elements 9 are pivoted into the locked position. Moreover, it may be seen that the guide element 36 is pivoted upwardly about the axis and no longer bears against the guide surfaces.

Figure 14:
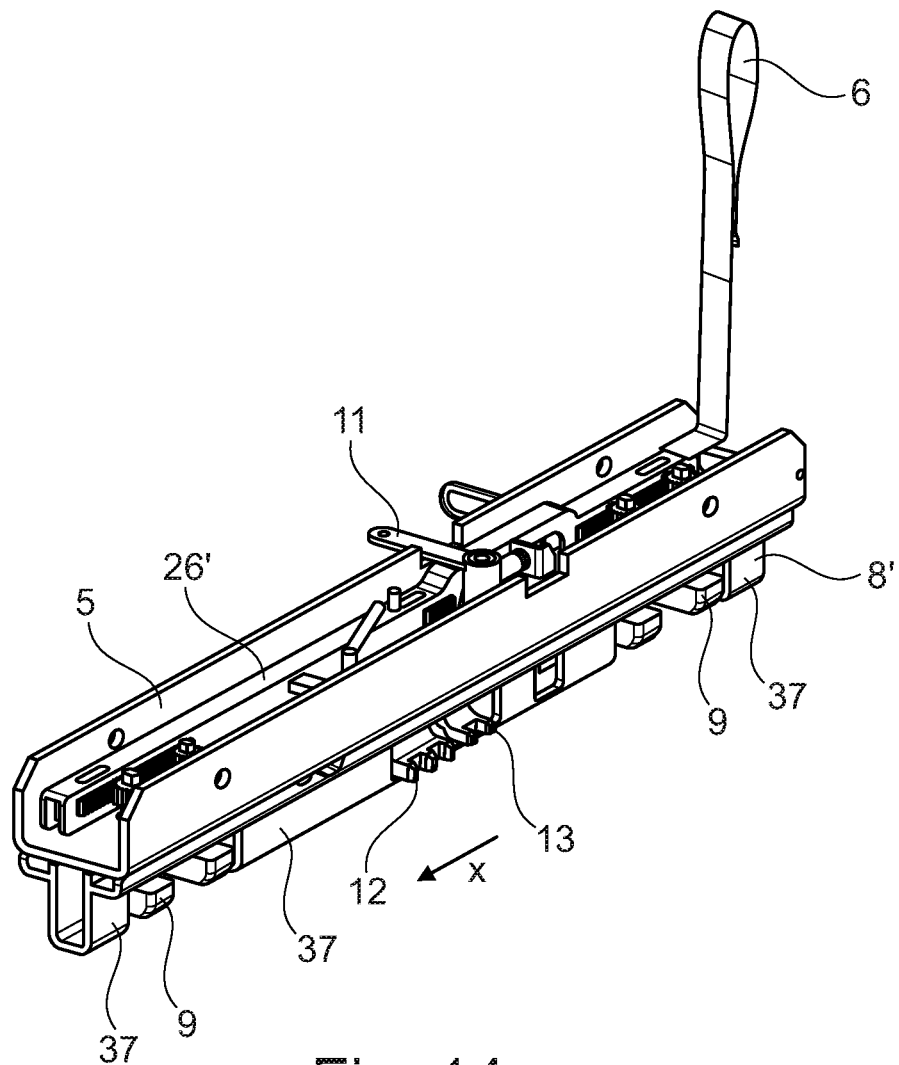
FIG. 14 illustrates a perspective view of a seat rail with a contact system, in accordance with another embodiment.

A further embodiment of a blocking and contact system of the invention for the electrical connection of an on-board power supply of a motor vehicle to a removable vehicle seat or a seat system is shown in FIGS. 14 and 15. The same components which are described above are provided with the same reference numerals and are not described in more detail at this point.

Instead of individual sliding elements 8, a sliding rail 8' is attached to the seat rail 5 on the side of the U-shaped profile facing the floor rail. This sliding rail 8' comprises individual sliding portions 37 which engage in the floor rail for slidable bearing. Moreover, the sliding rail 8' is designed with corresponding recesses for the locking elements 9 and the blocking and contact elements 12, 13.

In contrast to the exemplary embodiment described above, the adjustment movement for actuating the blocking and contact elements 12, 13 and the locking elements 9 is effected in this case via a toothed rod drive 42, 43. To this end, the actuating rail 26' is designed on a front, rear and central portion 40a, b, c in the form of a toothed rod 41. The toothed portions 40a, b, and c are, in this case, arranged on a side region of the actuating rail 26'. The front and rear toothed portions 40a, b, c in this case are assigned to the locking elements 9. For the purpose of adjusting the locking elements 9, at the upper end region of the pivot pins 24 said locking elements are provided with a toothed pinion 44. The toothed pinions 44 are arranged such that they are operatively connected to the associated toothed portions 40a, 40c and, with a longitudinal adjustment of the actuating rail 26' in the x-direction, the toothed pinions mesh with the toothed portions so that the translatory movement is converted into a rotational movement and the locking elements 9 may be adjusted about the axis 24 into the locked and/or unlocked position.

The blocking and contact elements 13, 15 are also adjusted via a displacement of the actuating rail 26', either via the actuating lever 6 or via an actuation of the actuating lever 7, 11. To this end, on the pivot pin 21' which on its lower end region has the entrainer yoke 23, a toothed pinion 45 is also arranged on the opposing upper end region. The toothed pinions 45 are arranged such that they are operatively connected to the associated toothed portion 40b and with a longitudinal adjustment of the actuating rail 26' in the x-direction the toothed pinion meshes with the toothed portion so that the translatory movement is converted into a rotational movement and the contact and blocking elements, as already explained with reference to the exemplary embodiment described in FIGS. 1 to 13, may be adjusted into the locked/contacted position and/or unlocked/non-contacted position.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Motor vehicle seat
2 Rail system
3 Seat rail pair
4 Floor rail
5 Seat rail
6 First actuating element
7 Second actuating elements
8 Sliding elements
8' Sliding rail 9 Locking elements (z-direction)
10 Blocking unit and contact unit
11 Actuating lever
12 Blocking element
13 Contact element
14 Axis
15 Toothed profile
16 Grooves
17 Toothed profile
18 Contact pin
19 Entrainer yoke
20 Axis
21 Pivot pin
21' Pivot pin
22 Driver element
23 Entrainer yoke
24 Pivot pin
25 Slide block
26 Actuating rail
26' Actuating rail
27 Groove
28 Pin
29 Stop
30 Recess
31 Left-hand side wall
32 Right-hand side wall
33 Link plate
34 Groove
35 Pin
36 Guide element
37 Sliding portions
40a, b, c Toothed portions
42 Toothed rod drive
43 Toothed rod drive
44 Toothed pinion
45 Toothed pinion

What is claimed is:

1. A motor vehicle seat system, comprising:
a vehicle seat;
a rail system including at least one floor rail fixed to a floor of the motor vehicle, at least one seat rail attached to the motor vehicle seat and removeably mounted on the floor rail for displacement in a longitudinal direction, an actuating rail displaceably mounted in the at least one seat rail, and at least one actuating element to facilitate displacement of the actuating rail relative to the at least one seat rail; and
a blocking and contact unit, that includes at least one blocking element and at least one contact element which are opposingly and symmetrically arranged on the at least one seat rail in pairs in the longitudinal direction, the blocking and contact unit being operatively connected to the actuating rail and spring-loaded so as to pivot on the at least one seat rail about a same axis oriented in the longitudinal direction between a first pivot position and a second position, wherein the first pivot position simultaneously engages the at least one blocking element with the floor rail which locks a position of the vehicle seat and also establishes electrical contact of the at least one contact element and the floor rail which establishes the electrical connection of the vehicle seat to an on-board power supply, and the second pivot position simultaneously disengages the at least one blocking element with the floor rail which unlocks the position of the vehicle seat and also releases the electrical contact of the at least one contact element and the floor rail which releases the electrical connection of the vehicle seat to the on-board power supply.

2. The motor vehicle seat system of claim 1, wherein the at least one blocking element comprises a toothed profile configured to engage in corresponding grooves of the floor rail to facilitate a releaseable connection between the at least one blocking element and the floor rail.

3. The motor vehicle seat system of claim 1, wherein:
the at least one seat rail comprises at least one locking element to lock the seat, and
the at least one locking element is operatively connected to the actuating rail for actuation via the at least one actuating element.

4. The motor vehicle seat system of claim 3, further comprising a toothed rod drive to facilitate an adjustment movement and/or operative connection between the actuating rail and the locking element.

5. The motor vehicle seat system of claim 3, wherein the actuating rail has at one region thereof a toothed rod to mesh with at least one toothed pinion of the locking element to facilitate an actuation of the locking element into the locked position, and vice-versa.

6. The motor vehicle seat system of claim 1, further comprising a toothed rod drive to facilitate an adjustment movement and/or operative connection between the actuating rail and the blocking and contact unit.

7. The motor vehicle seat system of claim 1, wherein the actuating rail comprises a toothed rod which meshes with a toothed pinion of the blocking and contact unit to facilitate actuation of the at least one blocking element and the at least one contact element into the blocked and contact position, and vice-versa.

8. The motor vehicle seat system of claim 1, further comprising a pivotably mounted pivot pin to facilitate an adjustment movement and/or operative connection between the actuating rail and the blocking and contact unit.

9. The motor vehicle seat system of claim 8, wherein the pivot pin extends in a vertical direction and is attached to an actuating lever coupled to the at least one actuating element so as to pivot upon actuation of the actuating lever.

10. The motor vehicle seat system of claim 9, further comprising a sliding guide between the actuating lever and the actuating rail to facilitate pivoting of the actuating lever and/or rotation of the pivot pin when the actuating rail is actuated.

11. The motor vehicle seat system of claim 8, further comprising a driver element guided centrally through a lower end region of the pivot pin.

12. The motor vehicle seat system of claim 11, wherein the driver element comprises a radially outwardly guided entrainer yoke.

13. The motor vehicle seat system of claim 12, wherein actuation of the at least one actuating element causes rotation of the pivot pin for attachment of the entrainer yoke to the blocking element.

14. The motor vehicle seat system of claim 13, wherein the entrainer yoke, with the pivoting of the at least one blocking element in a direction of the floor rail, cause entrainment of the at least one contact element for establishing the electrical contact.

15. A blocking and contact system for a motor vehicle seat system having at least one seat rail and at least one floor rail, the blocking and contact system comprising:
a blocking and contact unit that includes at least one blocking element and at least one contact element, which are opposingly and symmetrically arranged in pairs on the at least one seat rail in a longitudinal direction and spring-loaded so as to pivot about a same axis oriented in the longitudinal direction between a first pivot position and a second position, wherein the first pivot position simultaneously engages the at least one blocking element with the floor rail which locks a position of the vehicle seat and also establishes electrical contact of the at least one contact element and the floor rail which establishes the electrical connection of the vehicle seat to an on-board power supply of the vehicle, and the second pivot position simultaneously disengages the at least one blocking element with the floor rail which unlocks the position of the vehicle seat and also releases the electrical contact of the at least one contact element and the floor rail which releases the electrical connection of the vehicle seat to the on-board power supply.

16. A motor vehicle seat system, comprising:
a vehicle seat configured for electrical connection to an on-board power supply of the motor vehicle;
a rail system, to facilitate displacement of the vehicle seat in a longitudinal direction, the rail system including at least one floor rail fixed to a floor of the motor vehicle and at least one seat rail attached to the motor vehicle seat and removeably mounted on the floor rail for displacement in the longitudinal direction; and
a blocking and contact unit that includes at least one blocking element and at least one contact element arranged adjacent to each other on the at least one seat rail in the longitudinal direction and spring-loaded so as to pivot about a same axis oriented in the longitudinal direction between a first pivot position and a second position, wherein the first pivot position simultaneously engages the at least one blocking element with the floor rail which locks a position of the vehicle seat and also establishes electrical contact of the at least one contact element and the floor rail which establishes the electrical connection of the vehicle seat to the on-board power supply, and the second pivot position simultaneously disengages the at least one blocking element with the floor rail which unlocks the position of the vehicle seat and also releases the electrical contact of the at least one contact element and the floor rail which releases the electrical connection of the vehicle seat to the on-board power supply.

* * * * *